(12) United States Patent
Umeda et al.

(10) Patent No.: US 6,459,186 B1
(45) Date of Patent: Oct. 1, 2002

(54) AC GENERATOR FOR VEHICLES

(75) Inventors: Atsushi Umeda, Okazaki (JP);
Tsutomu Shiga, Nukata-gun (JP); Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/626,240

(22) Filed: Jul. 26, 2000

Related U.S. Application Data (62) Division of application No. 09/084,292, filed on May 26, 1998, now Pat. No. 6,137,201.

(30) Foreign Application Priority Data

May 26, 1997 (WO) .................................. PCT/JP97/01778
Oct. 14, 1997 (JP) .............................................. 9-297882

(51) Int. Cl.⁷ .............................. H02K 1/04; H02K 3/04
(52) U.S. Cl. ..................................................... 310/208
(58) Field of Search ................................ 310/179, 180, 310/195, 201–203, 208, 254; 29/596–518

(56) References Cited

U.S. PATENT DOCUMENTS

| | | | |
|---|---|---|---|
| 1,306,625 A | * 6/1919 | Priest | 310/208 |
| 1,822,261 A | 9/1931 | Apple | |
| 1,826,295 A | 10/1931 | Apple | |
| 2,407,935 A | 9/1946 | Perfetti | |
| 2,928,963 A | 3/1960 | Bertsche | |
| 3,634,708 A | 1/1972 | Fisher | |
| 4,425,519 A | 1/1984 | Balke | |
| 4,829,206 A | 5/1989 | Honshima et al. | |
| 4,870,307 A | 9/1989 | Kitamura | |
| 4,876,473 A | 10/1989 | Tanaka et al. | |
| 5,093,591 A | 3/1992 | Kitamura | |
| 5,097,167 A | 3/1992 | Kanayama | |
| 5,115,556 A | * 5/1992 | Gavrilidis et al. | 310/43 |
| 5,552,651 A | 9/1996 | Radomski | |
| 5,587,619 A | 12/1996 | Yumiyama et al. | |
| 5,619,787 A | 4/1997 | Couture et al. | |
| 5,691,590 A | 11/1997 | Kawai | |
| 5,726,511 A | 3/1998 | Kusase et al. | |
| 5,742,498 A | 4/1998 | Taniguchi | |
| 5,778,512 A | 7/1998 | Ichikawa et al. | |

(List continued on next page.)

FOREIGN PATENT DOCUMENTS

| | | |
|---|---|---|
| DE | 3433450 A1 | 3/1986 |
| DE | 38 03 752 | 8/1988 |
| DE | 3704780 A1 | 11/1988 |
| DE | 40 31 276 A1 | 4/1992 |
| EP | 0 393 486 | 10/1990 |
| FR | 524 013 | 8/1921 |
| FR | 2 376 544 | 7/1978 |
| FR | 2 584 246 | 1/1987 |
| JP | 48-442 | 1/1973 |
| JP | 50-47102 | 4/1975 |
| JP | 53 039458 | 4/1978 |
| JP | 59-159638 | 9/1984 |
| JP | 61 154439 | 7/1986 |
| JP | A-62-203527 | 9/1987 |
| JP | 62-272836 | 11/1987 |

OTHER PUBLICATIONS

European Search Report dated Jan. 3, 2002.

*Primary Examiner*—Tran Nguyen
(74) *Attorney, Agent, or Firm*—Oliff & Berridge, PLC

(57) ABSTRACT

An AC generator for a vehicle including a rotor with a fan, a stator disposed around the outer periphery of the rotor, and frame. The stator includes a laminated core having a plurality of slots, a plurality of electric conductors in the slots, and an insulator. There is a gap between the electric conductors and the insulator in a diametrical section of the slots, and an area ratio of the gap with respect to the sectional area of the slots is not more than 25%. A portion of the electric conductor positioned within the slot has a substantially rectangular shape along the shape of the slot.

8 Claims, 7 Drawing Sheets

| | U.S. PATENT DOCUMENTS | | | JP | 7-303351 | 11/1995 |
|---|---|---|---|---|---|---|
| | | | | JP | 8-205441 | 8/1996 |
| JP | 63-274335 | 11/1988 | | JP | 8-298756 | 11/1996 |
| JP | 64-5340 | 1/1989 | | JP | 63-194543 | 3/1998 |
| JP | 1-278242 | 11/1989 | | WO | 84-01478 | 4/1984 |
| JP | 3-159549 | 9/1991 | | WO | 92-06527 | 4/1992 |
| JP | 3-235664 | 10/1991 | | * cited by examiner | | |

AC GENERATOR FOR VEHICLES

CROSS REFERENCE TO RELATED APPLICATION

This is a division of application Ser. No.09/084,292, filed May 26,1998, now U.S.Pat. No. 6,137,201.

The present application is based on and claims priority from PCT Application PCT/JP97/1778 filed on May 26, 1997 and Japanese Patent Application Hei 9-297882 filed on Oct. 14, 1997, the contents of which are incorporated herein by reference.

BACKGROUND OF THE INVENTION

1. Field of the Invention

The present invention relates to an AC generator for vehicles loaded on cars, trucks and the like.

2. Description of the Related Art

Recently, the engine and whole electric appliances of a vehicle are close to the road surface due to the slant nose of the vehicle. The slanted nose is designed for reducing the vehicle running resistance and improving the visibility. The water-splashing conditions caused by splashing water from tires during the running of the vehicle can be harsh. Further, in cold areas, a large amount of salts are scattered for the purpose of preventing the road from freezing during winter, and salt or water containing salt are dragged in during the running of the vehicle, resulting in harsher corrosive environment. Since the vehicular generator is exposed to the above-described environment, the generation of electrical energy may be stopped. As a result, when the vehicle stops, there is a danger of leaving people freezing to death in the cold weather.

The stoppage of the generation, in this case, is mainly caused by the fact that water is moved into the inner wall portion of the slot of the stator core thereby resulting in rust. The rust grows to reduce a sectional area of the slot, which changes after passage of time by which the conductors of the stator coil inserted into the slot is pressed to produce a short-circuit between the coils, resulting in a breakage of coil due to the burn loss of local heat generation. Further, even if insulating paper is provided to insulate between the slot and the coil, the insulating paper is sometimes broken due to the growth of rust and the rise in pressure of slot, resulting in a short-circuit between the electric conductors and stator. Furthermore, the movement of water into the slot of coil is repeated whereby the coil film leads to corrosion deterioration such as hydrolysis. This results in a short-circuit between the electric conductors. The repeated entry of water into the slot of the coil also leads to the burn loss of local heat generation and the elution of copper, finally resulting in a breakage of coil. This tendency is particularly problematic in the slot in which electric conductors of the coils are thickly present because during the step of inserting or after inserting the electric conductors into the slot of the stator coil, the insulating films on the surface of the electric conductors rub together to damage or locally reduce its thickness.

Further, in order to prevent the electric conductors of the coils, which are inserted into the slots, from projecting from the inlet of the slots, wedges made of insulating material are inserted between the electric conductors and the inlets of the slots. However, the insulation coating of the electric conductors may be harmed or thinned when inserting the wedges. Thus, in order to improve the durability, the protection of the surface of the insulation coating of the electric conductors while the stator is manufactured is very important.

In general, the coil ends are impregnated with thermosetting resin for insulation. The viscosity thereof is arranged to stay in the portions during the thermosetting period, and the resin does not flow into the slots. This does not insulate inner portions of the slots sufficiently to prevent the short circuit.

On the other hand, a slot of a stator coil can be coated with an insulating resin by means of electrode position coating or the like, and providing insulation paper for insulating between the slot and electric conductors of the coil is provided, as described in Japanese Patent Application Laid-Open No. Hei 1-278242. Further, a drip-proof cover is provided on the cooling air take-in side of a generator to cut off a direct water-splashing path from the outside, as described in Japanese Patent Application Laid-Open No. Hei 3-235644.

The method disclosed in Japanese Patent Application Laid-Open No. Hei 1-278242, provides no solution against the short-circuit between the electric conductors of coils due to the corrosion deterioration of the coil film in the slot. Further, the slot is narrowed by the thickness of the resin film and insulating paper to reduce the space for inserting the electric conductors of the coil by their thicknesses. This prohibits the increase of the thickness of the film of the coil to enhance the its corrosion resistance. Since the coating step is necessary, the production cost including material cost increases.

Figure 10:
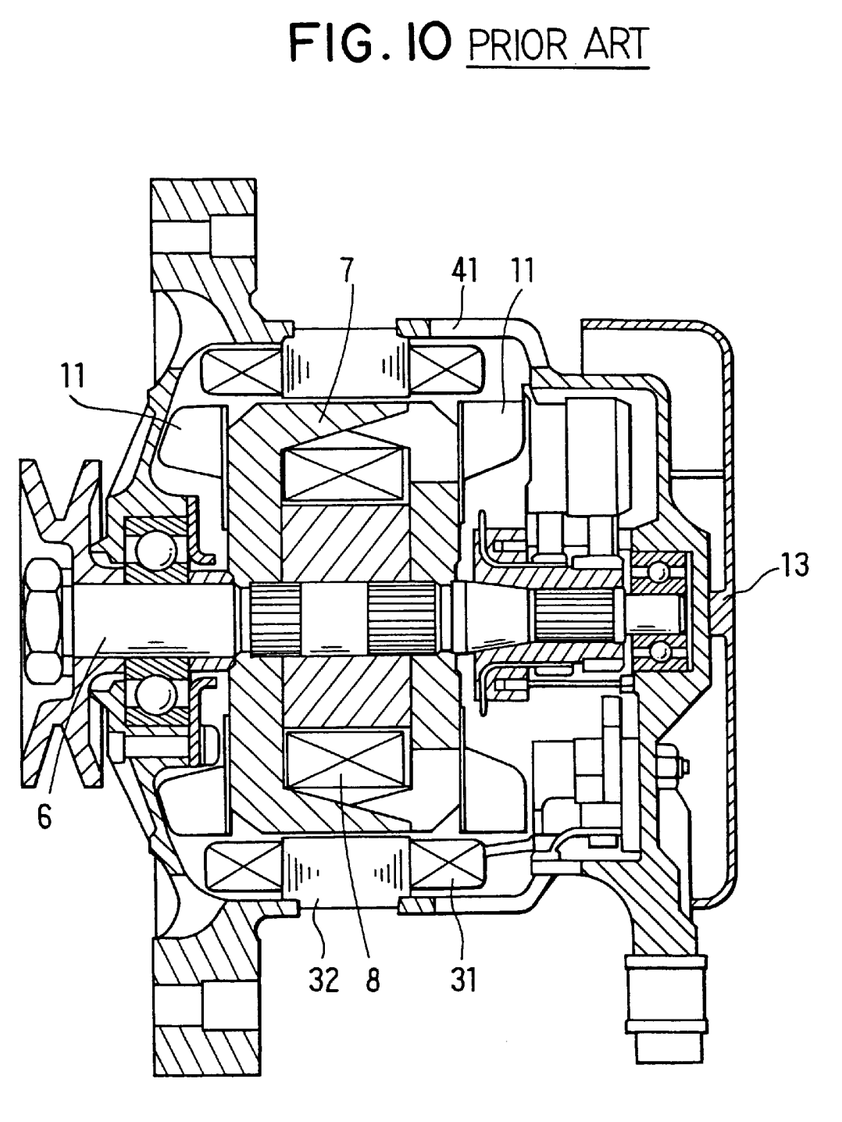
FIG. 10 is a view showing a conventional construction of an AC generator for automobiles having a drip-proof cover.

Further, in the method disclosed in Japanese Patent Application Laid-Open No. Hei 3-235644, teaches that in a recent small and high-output vehicular generator, a fan is provided on the side of a rotor. The rotation of the fan causes cooling air is taken into the generator. A stator coil is cooled by utilizing air discharged through a window provided diametrically of a frame, as shown in FIG. 10. That is, since the stator coil is positioned near the window for ventilation provided diametrically of the frame, water or salt water from the diametrical outside of the generator can easily reach the periphery of the stator. To prevent this, it is contemplated that a drip-proof cover is further mounted externally of the window provided diametrically of the frame. In this case, however, the ventilation resistance increases and the quantity of cooling air reduces, and an escape of hot air is impeded, thus posing a problem in that a temperature of the whole generator considerably rises. This addition of the drip-proof cover increases the production cost, similarly to the addition of the coating step as described above.

Figure 11:
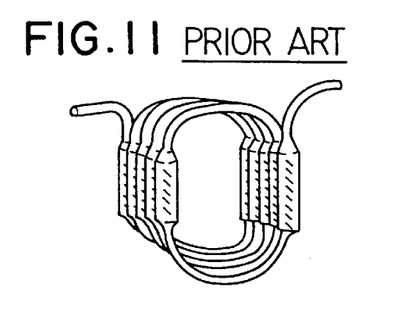
FIG. 11 is a perspective view of a conventional electric conductor.

Further, JP-A-63-194543 discloses an electric conductor as shown in FIG. 11. The slots are generally rectangular in cross-section. The electric conductor has a portion inserted in a slot which generally has a generally rectangular cross section and a portion outside the slot which generally has a round cross-section. Thus, occupation ratio of the electric conductor in the slot becomes more than 80%. In other words, the ratio of the area in the gap is less than 20%. However, in this structure, a number of round conductors are stacked and formed to be rectangular. Therefore, the insulation coatings are harmed or the thinned due to rubbing or difference in the degree of deformation.

The present invention solves the above-described problems of prior art. An object of the present invention is to provide an AC generator for vehicles capable of preventing stoppage of generator due to a short-circuit within a stator slot caused by water-splashing from outside and which is excellent in terms of cost and does not pose new problems such as a rise in temperature or harm of the insulation coating of the electric conductors of the stator coil.

SUMMARY OF THE INVENTION

According to a first aspect of the present invention, a generator for a vehicle comprises a rotor having a fan on at least one side of both axial ends, a stator disposed oppositely of an outer periphery of the rotor, and a frame for supporting the rotor and the stator. The stator comprises a laminated core having a plurality of slots, a plurality of electric conductors of the stator coil housed in the slots, the electric conductors has generally the same cross sections inside and outside the slot and an insulator that provides electric insulation. There is a gap except the electric conductors and the insulator in a diametrical section of the slots, and an area ratio of the gap with respect to the sectional area of the slots is not more than 25%.

With this arrangement, even if water droplets containing salt or the like arrive at the neighborhood of an inlet of the slots of the stator core, the space gap for movement thereof into the slots is narrow. Thus, the water droplets remain on the external side of the stator core and do not flow into the space gap of the slots. This can prevent the generation of rust in the inner wall portion of the slots of the stator core and the corrosion deterioration of a coil film in the slots, thus preventing a short-circuit between the electric conductors of the coil and the stator core and between the electric conductors of the coils. Further, since the coating of inside of the slots and a drip-proof cover are not necessary, it is possible to reduce costs as compared with prior art. Moreover, when a polyamide resin and or a polyester resin are used for the film of the coil and the insulator, it is possible to prevent water droplets form moving into the space gap in the slots since these resins have a hydrophobic property. Further, because the above electric conductors have almost the same cross sections, harm or the thinning of the insulation coatings can be prevented.

According to the second aspect of the present invention, in the AC generator according to the first aspect, the width of the inlet of the slots is narrower than the minimum width of the electric conductors disposed in the slots, and there is only an insulator between the electric conductor and wall of the slot near the inlet. Thus, the electric conductors disposed in the inner periphery of the slots function to prevent other conductors in the slots from projecting from the inlet of the slots. Therefore, wedges can be omitted, so that harm or the thinning of the insulation coating during insertion of the wedges can be prevented and that short circuiting between the electric conductors or between conductors and the stator core due to water splashing can be prevented. Further, since the wedge can be omitted, the cost of parts and manufacturing can be reduced.

According to the third aspect of the present invention, the electric conductors according to the second aspect can be inserted along the slots so that the ratio of area in the gap can be reduced to less than 25%.

According to the fourth aspect of the invention, the electric conductors according to the first aspect of the invention disposed in the same slot are spaced apart from one another outside the slot. Therefore, there is no groove between the neighboring electric conductors, electrolyte such as salt water can not enter the inside of the slots guided by the groove. Thus according to the present invention, the electric conductors of the stator coils has the same cross sections both inside and outside the slots, and distance between the conductors in the slots is less than a certain value. Therefore, the stoppage of the generator caused by water-splashing from outside can be prevented. This is excellent in terms of cost.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE EMBODIMENTS

The AC generator for vehicles according to the present invention will be described hereinafter on the basis of various forms of embodiments shown in the drawings.

Figure 1A:
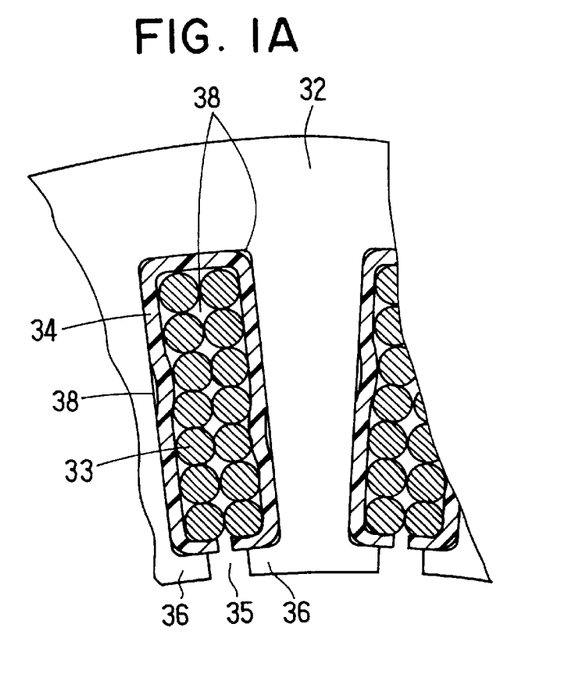
FIG. 1A is a partial sectional view of a stator according to a first embodiment of the present invention.
Figure 1B:
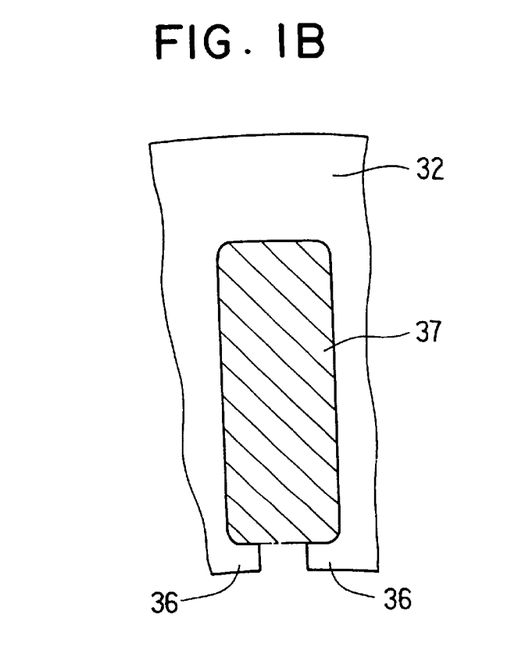
FIG. 1B is a view showing a range of a sectional area of a slot.
Figure 2:
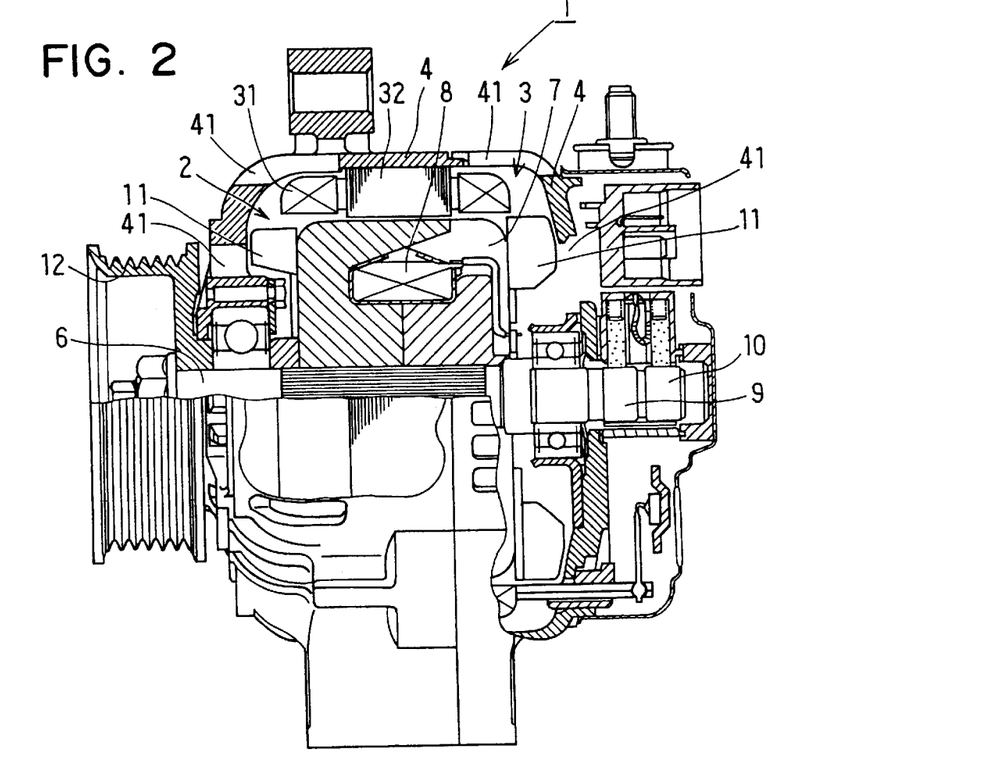
FIG. 2 is a sectional view of main parts of an AC generator according to the present invention.

FIGS. 1A, 1B and 2 show a first embodiment of the present invention. FIGS. 1A and 1B are partial sectional, views of a stator according to the present embodiment, and FIG. 2 shows main parts of the AC generator for vehicles.

An AC generator for vehicles 1 comprises a rotor 2 functioning as a field, a stator 3 functioning as an armature, and a frame 4 for supporting the rotor and the stator.

The rotor 2 rotates integral with a shaft 6, and is constituted by two sets of Lundell type pole cores 7, a cooling fan 11, a field coil 8, slip rings 9 and 10, and the like. The shaft 6 is connected to a pulley 12 and is rotatively driven by a running engine (not shown) loaded on the automobile.

The frame 4 is provided with an air discharge port in a portion opposite to a coil end 31 of the stator and an intake hole 41 in the axial end.

As shown in FIG. 1A, the stator 3 is constituted by a stator core 32 and electric conductors 33 of a stator coil. The electric conductors 33 are continuous wires and have a round cross-section. The stator 3 also has an insulator 34 for electrically insulating between the stator core 32 and the stator coil, and is supported by the frame 4. The stator core 32 is formed from a laminate of thin steel sheets, and is formed with a number of slots having an opening 35 on the inner peripheral side thereof. The electric conductors 33 of the stator coils are housed in the slots in a substantially equally dispersed pattern, and space gaps 38 are formed in the slots in a substantially equally dispersed pattern. As viewed in FIG., 1A, the radially adjacent electric conductors 33, bridge circumferentially from side to side of the insulator 34. Further, the electric conductors 33 give the appearance of a "train" both circumferentially and radially as they are in contact with adjacent electrical conductors 33. The insulator 34 is opened toward an inner peripheral opening 35 of the slot. The ratio of the total area of the space gap 38 except the electric conductors 33 of the stator coil and the insulator 32 to the cross-section 37 of the slot formed radially outer side portions of a magnetic flux collecting protrusion 36 is set to 25% or less with respect to the sectional area of the slot 37 on the external peripheral side of the magnetic flux collecting protrusion 36. The sectional area of the stator coil used is a maximum finished area value including a film thickness.

Figure 3:
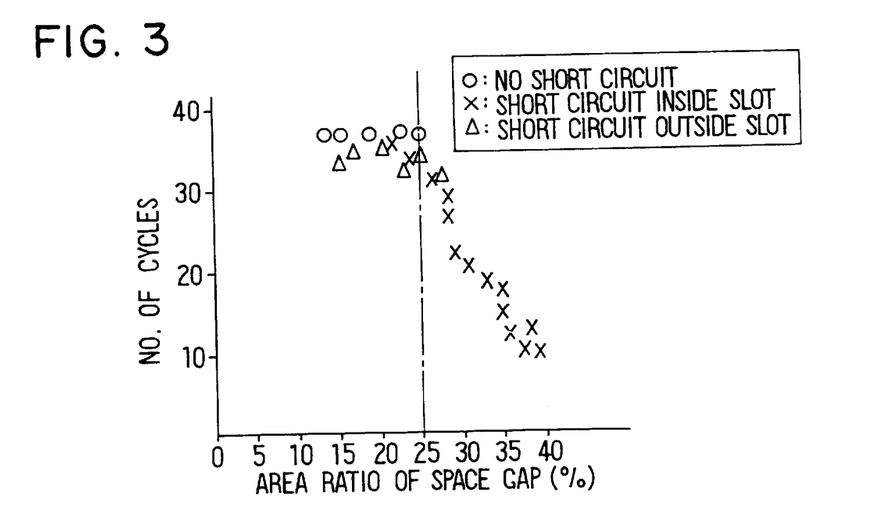
FIG. 3 is a view showing the results of numbers of cycles resulting in generation abnormality in a pattern test including atomization of salt water in the case where the ratio of area space gap within the slot is varied.

FIG. 3 shows the results of a salt water atomization pattern test supposing a cold district where the corrosive environment is harsh with the area ratio of the space gap is varied for an AC generator used in vehicles having the same physique. In the test, electric power is generated by the fixed time at the fixed rotation under the salt water atomization conditions in accordance with JIS-Z-2371, after which the atomization is stopped to generate electric power for the fixed time, and the rotation is stopped to leave the state as it is. The above operation as one cycle is repeated till abnormality of generation occurs. As a result, when the area ratio of the space gap exceeds 25%, salt water moves into the space gap 38 so that rust appears remarkably in the inner walls of the slots, resulting in the occurrence of; an electric short-circuit between the electric conductors of the coils in the slots and an electric short-circuit between the electric conductors of the coil and the inner wall of the slot, thus rapidly shortening the number of cycles. More preferably, the area ratio of the space gap is not more than 20% at which the short-circuit within the slot does not occur. Further, if not more than 15%, it can be also practically used in the cold district where the damage from sea wind is strong. As the cycle life extends, the short-circuit of the electric conductors of the coil is conspicuous not inside the slot as a first trouble spot but outside the slot as a second trouble spot.

Figure 4:
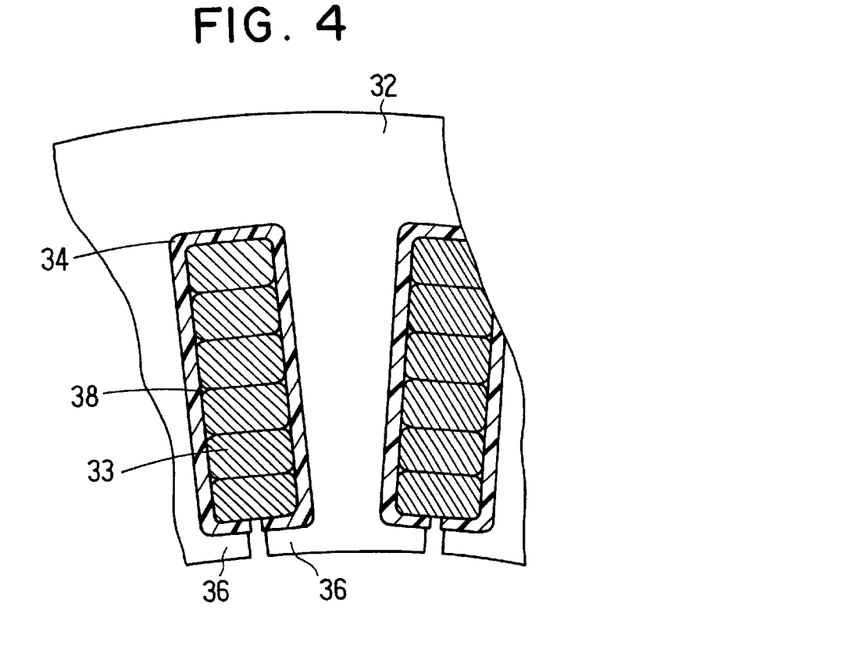
FIG. 4 is a partial sectional view of a stator in the case where a portion positioned within the slot of a stator coil is of substantially rectangular shape along the shape of the slot.

In the first embodiment, the electric conductors 33 of the stator coil are indicated by the circle line. However, if at least a portion positioned within the slot is of a substantially rectangular shape along the shape of the slot as shown in FIG. 4, an area of the space gap within the slot can be more easily reduced. A polyhedron section along the inner wall surface of the slot will provide the similar effect.

Further, the opening of the insulator 34 is closed by a single plane of an electric conductor and the end portions of the insulator 34 are inserted between the magnetic flux collecting protrusion 36 and the electric conductor 33 as shown in FIG. 4. Therefore, the inner periphery of the insulator 34 can be fixed and arranged without deviation with respect to the magnetic flux collecting protrusion 36. Thus, the peripheral opening 35 of the slot is closed by electric conductors and the insulator 34, and the movement of water from the inner periphery into the slot is completely cut off, and the space gap 38 in the slot is exclusively communicated with the open air merely by the axial end of the slot. Therefore, the effect for suppressing the movement of water can,be improved.

Further, the width of the peripheral opening of the slot 35 is narrower than the width of the electric conductors 33 of the coil in the slot the electric conductors 33. Therefore, the electric conductor 33 closing the peripheral opening 35 prevents other electric conductors 33 ih the slot from projecting inward. Therefore, the wedges can be omitted and harm or thinning of the insulation coating on the electric conductors can be prevented. Thus, a short circuit between the electric conductors and between the electric conductors and the stator core can be prevented, and the production cost can be reduced.

Figure 5:
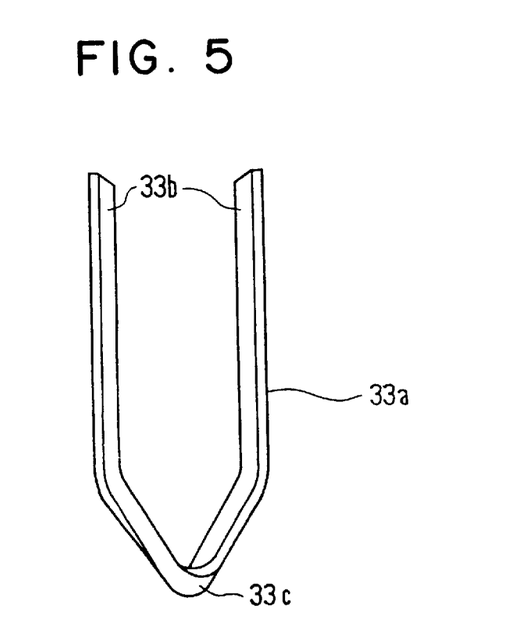
FIG. 5 is a perspective view in the case where a stator coil is not a continuous line but is a substantially U-shaped conductor segment having a turn portion.

The electric conductors of the stator coil can be substituted by a plurality of conductor segments instead of the continuous wire. For example, as shown in FIG. 5, generally U-shaped conductor segments having a U-turn portion 33c can be used. Such conductor segments are stacked so that the straight portions 33a thereof are aligned in the radial direction. Then, those are inserted into the stator core in the axial direction, and the straight portions 33a outside the stator core the opposite the U-turn portions 33c bent to connect the end portions 33b to form the stator coil.

Figure 6:
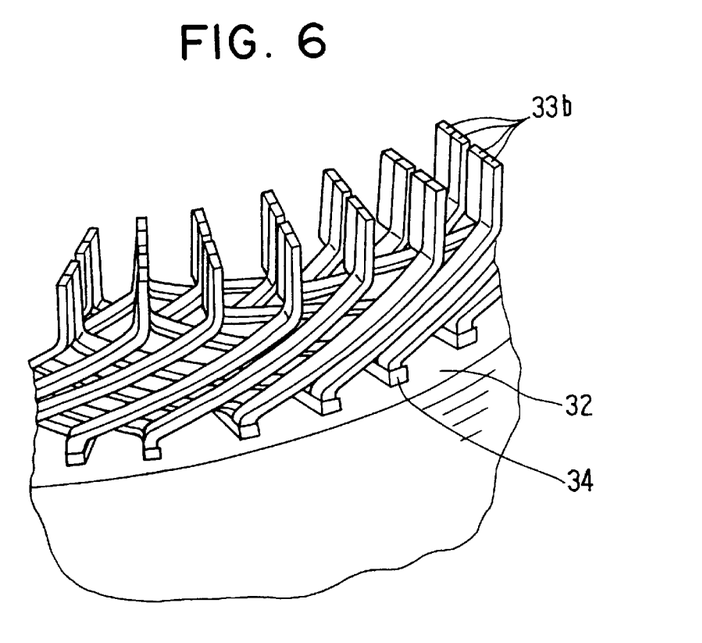
FIG. 6 is a perspective view of an end coil in the case where the conductor segment is incorporated.

Alternatively, a stator coil, which is not a continuous line but a substantially U-shaped conductor segment having a turn portion 33c as shown in FIG. 5, is inserted in an axial direction of a stator core with a straight line portion 33a arranged, and thereafter a conductor externally of the slot on the side opposite to the turn portion is bent and an end 33b is connected to provide a winding as a whole. The connection of the end 33b of each segment may be done by electric conduction such as supersonic deposition, arc welding, blazing or the like, or mechanical processing means such as caulking. Further, each conductor segment is divided into an outer layer positioned in the inner part of the slot and an inner layer positioned at an inlet, at least a pair of which are disposed so that the conductors of the inner layer and outer layer of different slots are connected in series. This arrangement can avoid an interference between different phases at the coil end, as shown in FIG. 6. As described above, since the conductor segment can be easily disposed in the inner part of the slot, the area of the space gap in the slot is reduced more easily. FIG. 6 shows the case where the number of conductors per slot is 4 turns, that is, the outer layers and inner layers are in two pairs. Even if the number of pairs is changed, the interference between the different phases can be avoided similarly. Further, if the winding is divided into conductor segments, the conductor is easily formed into a rectangular shape to provide a high space factor, and the conductors can be prepared by the press or the like.

A plurality of conductor segments are connected to form the stator coil as a follows. The following is disclosed in W092/06527.

Figure 12:
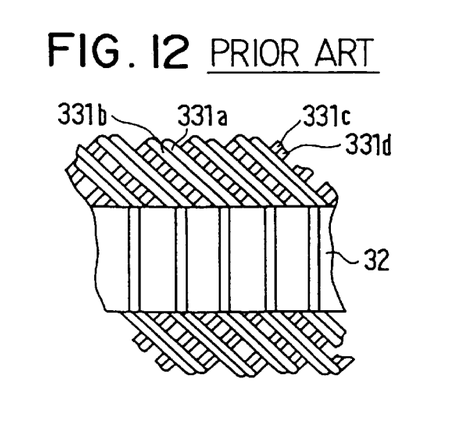
FIG. 12 is a partial front view of a conventional stator having electric conductor segments.
Figure 13:
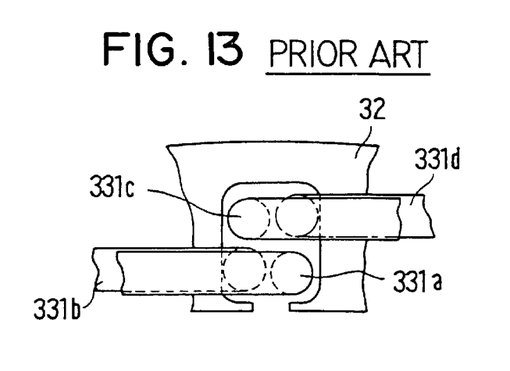
FIG. 13 is a partial enlarged view of a portion of a conventional stator having conductor segments.

As shown in FIG. 12, a plurality of conductor segments are used to form circumferentially aligned coil ends. In a slot, as shown in FIG. 13, two conductors 331a, 331b disposed radially inner side and two conductors 331c, 331d disposed rear side thereof. The conductor 331a, 331b are bent to have inclined portions, and the conductors 331c, 331d are bent to have inclined portions extending in the opposite direction. Thus, grooves or gutters are formed the neighboring conductors 331a, 331b and 331c, 331d. Therefore, salt water or other electrolyte may be guided by the grooves to the axial opening of the slots, thereby causing corrosion resulting in the short circuit.

On the other hand, the conductor segments according to the present invention are disposed in the slots so that the conductors can be aligned in the radial direction and so that the neighboring conductors on the coil ends extend from the slots at angles different from each other to be spaced apart from each other. In particular, as shown in FIG. 6, the neighboring conductors extending oppositely in the circumferential direction from the slots. Thus, in the coil ends, there is no groove formed to guide electrolyte such as salt water, thereby preventing corrosion in the slots.

In the coil ends, the neighboring conductors are spaced apart from each other to form gaps in the coil ends. Therefore, cooling air as well as salt water can be discharged to the outside easily.

A plurality of the electric conductors are aligned radially in the slot. Therefore, gaps are formed in the circumferential direction at an interval corresponding to the slot pitch. The projected area of the electric conductors aligned in the radially outer direction becomes smaller than that of the electric conductors disposed side by side in the circumferential direction as shown in FIG. 13. Therefore, the cooling air can flow effectively from the center of the rotation to the radially outward.

Figure 7:
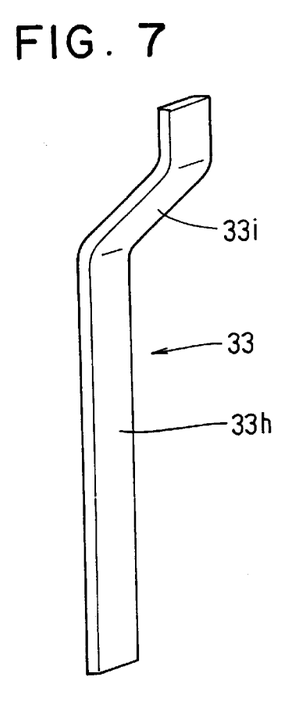
FIG. 7 is a perspective view of another conductor segment.

In place of the aforementioned substantially U-shaped conductor segment, a substantially J-shaped conductor segment is inserted in an axial direction of a stator core with a straight line portion 33h arranged, and thereafter, a connection is performed on substantially both sides of the stator core to provide a winding as a whole. In this case, the area of the space gap in the slot is easily reduced, and the shape of the conductor segment is simplified as compared with the substantially U-shape, thus facilitating the step of fabricating the segment itself, and providing inexpensive equipment.

Figure 8A:
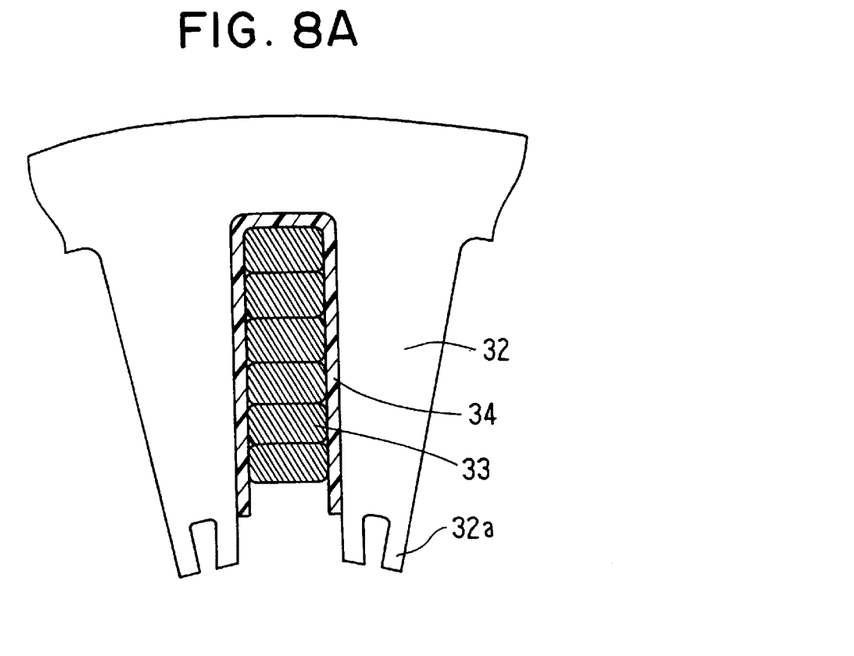
FIGS. 8A and 8B are partial sectional views of a stator before plastic deformation processing in the case where a magnetic flux collecting protrusion caused by plastic deformation is formed.
Figure 8B:
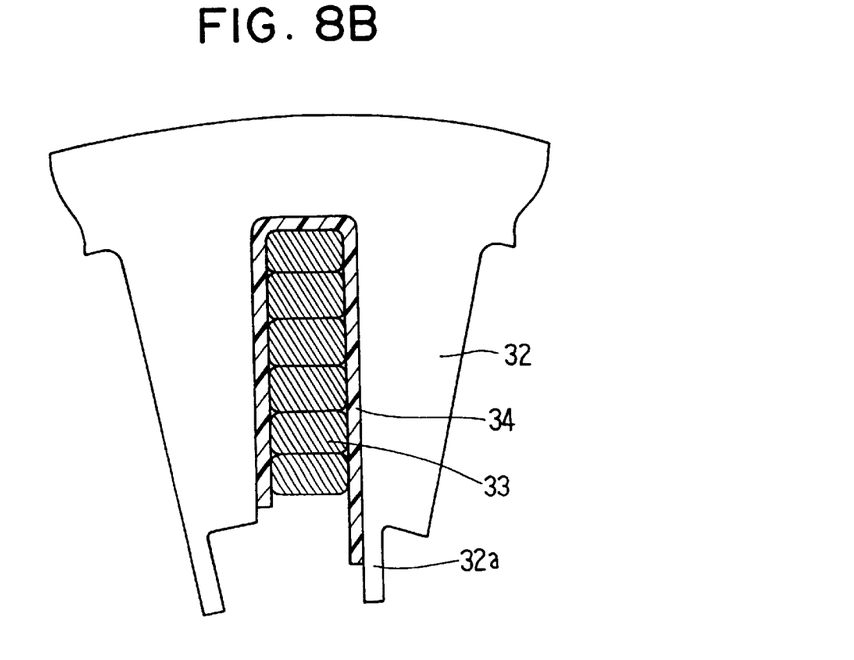

As shown in FIG. 8, a stator core can be configured so that an addendum extreme end 32a is formed into a U-shape or a J-shape, and a conductor segment is inserted from an inner peripheral side, after which a processing jig is pressed in a diametrical direction so as to form a magnetic flux collecting protrusion by plastic deformation. After the conductor has been inserted, it is compressed in a diametrical direction and the conductor is deformed while being adjusted to the shape of the slot, thus reducing the area of the space gap in the slot. The processing of the conductor segment can be performed beforehand, the assembling step is facilitated.

Figure 9:
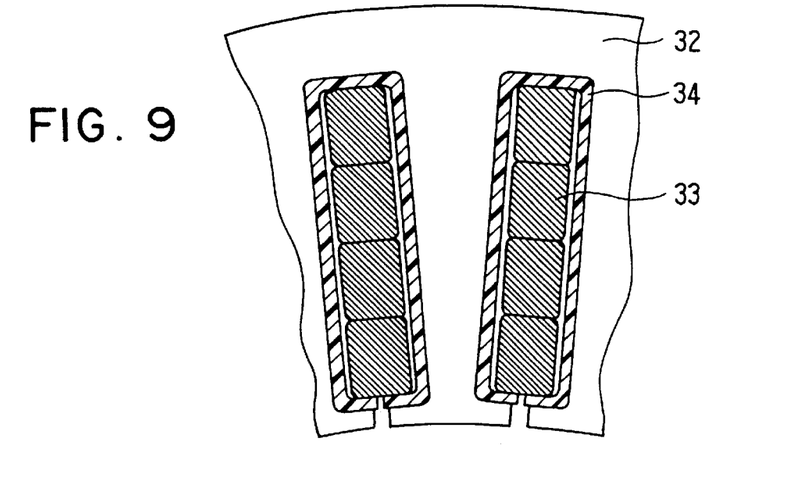
FIG. 9 is a partial sectional view of electric conductors of stator coils disposed in slots.

If the electric conductors of the stator coil has rectangular cross-section as shown in FIG. 9, the electric conductors are stacked at the shorter side of the conductors. Thus, area of the conductors in contact is reduced. There are gaps between the contact surfaces of the conductors, and the number increases as the contacting area increases under the same contacting condition. Therefore, reduction of the contacting area can reduce the number of gaps, resulting in reduction of the ratio of the gap in the slot.

As described above, the ratio of the gap in the slot being less than 25% ensure to hold the electric conductors in the slots. Therefore, water can be prevented from entering the slots without impregnation of resin for the conductor insulation, and the electric conductors are not vibrated in the slots by the high frequency vibration generated by the generator.

Further, according to the present embodiment, after a winding has been applied to the stator core, resin impregnation processing for securing the winding is carried out. It is needless to say that a path of water moving into the slot is further narrowed, it is effective in the abnormality of generation caused by water-splashing.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator for a vehicle comprising:

a rotor which functions as a field;

a stator disposed around the rotor, the stator comprising a laminated stator core having a plurality of slots, a stator winding housed in the slots, and an insulator for insulating the stator winding from the stator core; and a frame for supporting the rotor and the stator; wherein each of the slots is defined by circumferentially opposing side walls and radially opposing inner and outer walls, the inner wall defining an opening having a narrower circumferential width than a distance of the side walls, and wherein the stator winding comprises a plurality of electric conductors which have a smaller cross section than the width of the opening defined on the inner wall, and are arranged side by side to form at least two circumferentially extending trains in each of the slots and at least two radially extending trains in each of the slots, at least two of the electric conductors being arranged on each of the circumferentially extending trains and the radially extending trains, the electric conductors arranged on the circumferentially extending trains and the insulator being positioned between the side walls of the slot to be in contact with each other at circumferentially opposing surfaces and to form at least two bridges bridging between the side walls, and the electric conductors arranged on the radially extending trains and the insulator being positioned between the inner and outer walls of the slot to be in contact with each other at radially opposing surfaces and to form at least two bridges bridging between the inner and outer walls.

2. An AC generator for a vehicle according to claim 1, wherein said trains are radially stacked to provide a plurality of layers of said electric conductors in said slot.

3. An AC generator for a vehicle according to claim 2, wherein said electric conductors in at least a half of said plurality of said layers form said bridges.

4. An AC generator for a vehicle according to claim 2, wherein said electric conductors in at least an outermost layer and an innermost layer form said bridges.

5. An AC generator for a vehicle according to claim 1, wherein said slot is substantially filled with said electric conductors and the insulator.

6. An AC generator for a vehicle according to claim 1, wherein said electric conductors have a round cross section.

7. An AC generator for a vehicle according to claim 1, wherein each of said trains is a circumferentially extending line.

8. An AC generator for a vehicle, comprising:

a rotor which functions as a field;

a stator disposed around the rotor, the stator comprising a laminated stator core having a plurality of slots, a stator winding housed in the slots, and an insulator for insulating the stator winding from the stator core; and a frame for supporting the rotor and the stator; wherein each of the slots is defined by circumferentially opposing side walls and radially opposing inner and outer walls, the inner wall defining an opening having a narrower circumferential width than a distance of the side walls, and wherein the stator winding comprises a plurality of electric conductors which have a smaller cross section than the width of the opening defined on the inner wall, each of the electric conductors having a round cross section, the electric conductors being filled in the slot to provide at least two bridges bridging the side walls of the slot with the insulator, each of the bridges having the insulator on the side walls and at least two of the electric conductors arranged side by side, the insulator and the electric conductors forming the bridges by being in contact with each other at circumferentially opposing surfaces.

* * * * *